(12) United States Patent
Tanaka et al.

(10) Patent No.: US 12,110,076 B2
(45) Date of Patent: Oct. 8, 2024

(54) MOUNTING STRUCTURE OF SHIFT LEVER (71) Applicant: SUZUKI MOTOR CORPORATION, Hamamatsu (JP)

(72) Inventors: Shinji Tanaka, Hamamatsu (JP); Hideaki Fukushima, Hamamatsu (JP); Kazuhiro Iida, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 18/325,834

(22) Filed: May 30, 2023

(65) Prior Publication Data
US 2023/0406449 A1    Dec. 21, 2023

(30) Foreign Application Priority Data
Jun. 21, 2022 (JP) ................... 2022-099793

(51) Int. Cl.
*B62M 25/06* (2006.01)
(52) U.S. Cl.
CPC .................. *B62M 25/06* (2013.01)
(58) Field of Classification Search
CPC ..... B62M 25/06; B62K 25/283; B62K 25/286
See application file for complete search history.

(56) References Cited

U.S. PATENT DOCUMENTS

| 2016/0272266 A1 | 9/2016 | Hosoya et al. | ........ B62K 11/04 |
| 2021/0122441 A1* | 4/2021 | Eder | ..................... B62K 23/08 |

FOREIGN PATENT DOCUMENTS

JP      6235511 B2    11/2017

* cited by examiner

*Primary Examiner* — Terence Boes
(74) *Attorney, Agent, or Firm* — Stein IP, LLC (57) ABSTRACT

A mounting structure of a shift lever on a body frame which swingably supports a swing arm includes the shift lever configured to receive a shift operation from a driver, a rear cushion configured to extend and contract according to swinging of the swing arm, a cushion lever connecting the rear cushion and the swing arm, and a cushion rod connecting the cushion lever and the body frame. A mounting portion of the shift lever is disposed on an outer side of the body frame in a vehicle width direction. A mounting portion of the cushion rod is disposed on an inner side of the body frame in the vehicle width direction. An opening portion is formed on the body frame. The mounting portion of the shift lever and the mounting portion of the cushion rod overlap the opening portion in a side view.

7 Claims, 6 Drawing Sheets

MOUNTING STRUCTURE OF SHIFT LEVER

CROSS-REFERENCE TO RELATED APPLICATIONS

The disclosure of Japanese Patent Application No. 2022-099793 filed on Jun. 21, 2022, including specification, drawings and claims is incorporated herein by reference in its entirety.

TECHNICAL FIELD

The present disclosure relates to a mounting structure of a shift lever for a straddle-type vehicle.

BACKGROUND ART

A swing arm is swingably supported by a body frame of a straddle-type vehicle, and a rear wheel is rotatably supported by the swing arm. In order to enhance a road contact performance between a road surface and the rear wheel, the swing arm and a rear cushion are connected via a cushion lever (for example, see Patent Literature 1). The cushion lever of Patent Literature 1 is formed in a substantially triangular shape in a side view. A lower portion of the rear cushion, a lower portion of the swing arm, and one end of a cushion rod are connected to each apex of a link lever. The body frame is connected to the other end of the cushion rod. The rear cushion extends and contracts according to the swinging of the swing arm to absorb unevenness of the road surface.

Patent Literature 1: JP6235511B2

Depending on the model, it is necessary to dispose a mounting portion of the other end of the cushion rod and a mounting portion of the shift lever close to each other according to circumstances of a component layout and a riding position. When the mounting portion of the cushion rod and the mounting portion of the shift lever overlap each other with the body frame sandwiched therebetween in a side view, a size of the vehicle increases in a vehicle width direction, which may adversely affect the riding position. In addition, it is difficult to secure a tool line for mounting the cushion rod.

SUMMARY

The present disclosure has been made in view of the above, and an object of the present disclosure is to provide a mounting structure of a shift lever in which a shift lever and a cushion rod can be disposed close to each other without affecting a riding position, and the assemblability of the cushion rod can be improved.

A mounting structure of a shift lever according to an aspect of the present disclosure is a mounting structure of a shift lever on a body frame which swingably supports a swing arm. The mounting structure of the shift lever includes: the shift lever configured to receive a shift operation from a driver; a rear cushion configured to extend and contract according to swinging of the swing arm; a cushion lever connecting the rear cushion and the swing arm; and a cushion rod connecting the cushion lever and the body frame. A mounting portion of the shift lever is disposed on an outer side of the body frame in a vehicle width direction. A mounting portion of the cushion rod is disposed on an inner side of the body frame in the vehicle width direction. An opening portion is formed on the body frame. The mounting portion of the shift lever and the mounting portion of the cushion rod overlap the opening portion in a side view. Therefore, the above-described problem is solved.

BRIEF DESCRIPTION OF DRAWINGS

Exemplary embodiment(s) of the present disclosure will be described in detail based on the following figures, wherein.

DESCRIPTION OF EMBODIMENTS

In a straddle-type vehicle according to an aspect of the present disclosure, a swing arm is swingably supported by a body frame, the swing arm and a rear cushion are connected via a cushion lever, and the cushion lever and the body frame are connected via a cushion rod. The rear cushion extends and contracts according to the swinging of the swing arm to absorb unevenness or the like of a road surface, thereby improving a road contact performance between a rear wheel and the road surface. In addition, a shift lever that receives a shift operation from a driver is mounted on the body frame, a mounting portion of the shift lever is positioned on an outer side of the body frame in a vehicle width direction, and a mounting portion of the cushion rod is positioned on an inner side of the body frame in the vehicle width direction. An opening portion is formed on the body frame, and a size of the vehicle does not increase in the vehicle width direction due to the mounting portion of the shift lever and the mounting portion of the cushion rod overlapping with the opening portion in a side view. Therefore, even when the mounting portion of the shift lever and the mounting portion of the cushion rod are brought close to each other, a degree of freedom of a riding position is improved. In addition, a tool line is secured on the inner side of the opening portion of the body frame, thereby improving the assemblability of the cushion rod. Furthermore, since the cushion rod can be easily accessed by removing the shift lever, the maintainability is improved.

EMBODIMENTS

Figure 1:
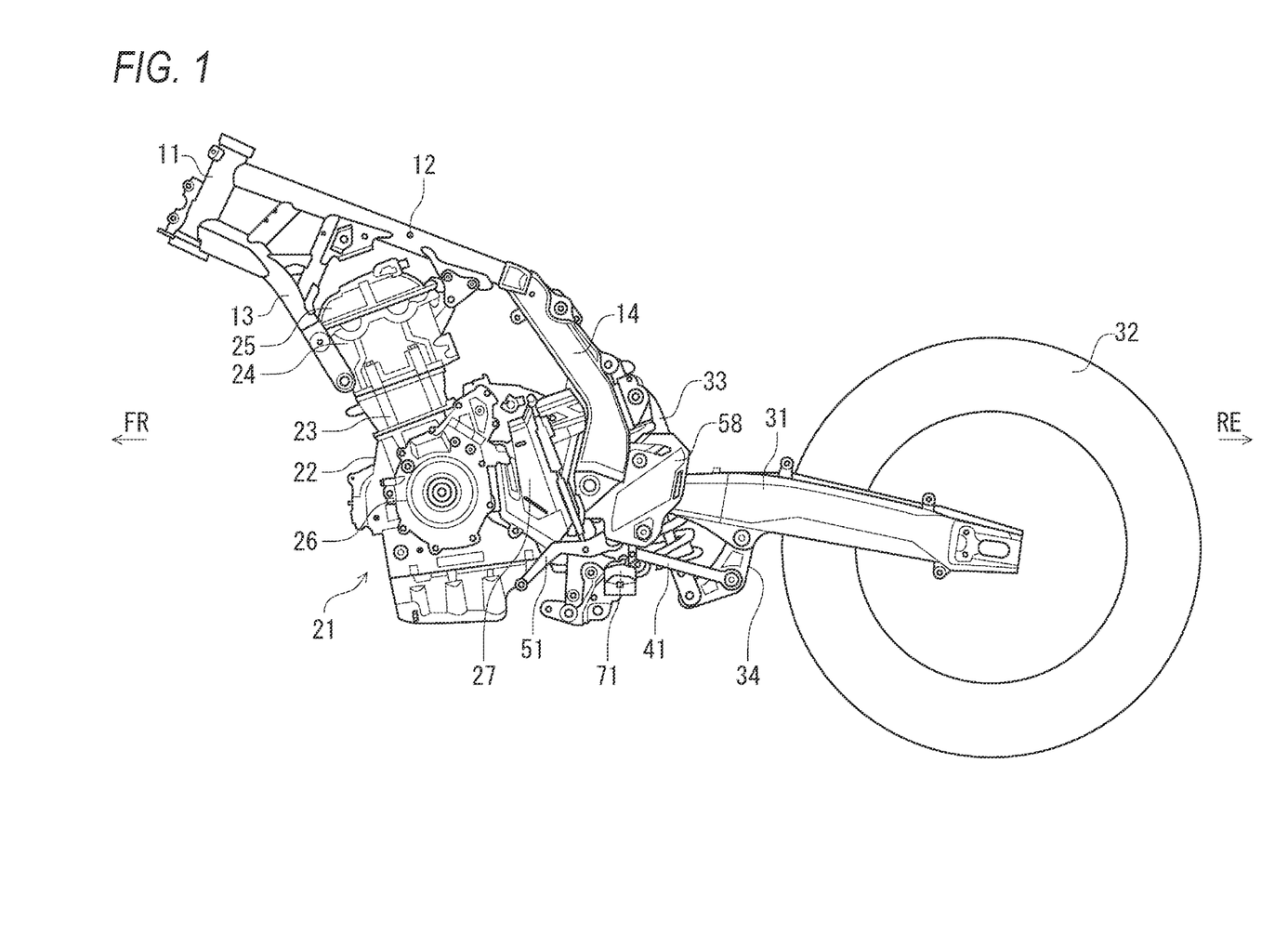
FIG. 1 is a left side view of a periphery of an engine of a straddle-type vehicle according to an embodiment.

Hereinafter, a straddle-type vehicle according to an embodiment will be described with reference to the accompanying drawings. FIG. 1 is a left side view of a periphery of an engine of a straddle-type vehicle according to the present embodiment. In addition, in the following drawings, an arrow FR indicates a vehicle front side, an arrow RE indicates a vehicle rear side, an arrow L indicates a vehicle left side, and an arrow R indicates a vehicle right side.

As shown in FIG. 1, a pair of main frames 12 are branched from an upper portion of a head pipe 11 to the left and right and extend rearward, and a pair of down frames 13 are branched from a lower portion of the head pipe 11 to the left and right and extend downward. A pair of body frames 14 extend downward from rear portions of the pair of main frames 12. Both front and rear sides of a cylinder head 24 of an engine 21 are supported by the pair of main frames 12 and the pair of down frames 13, and a rear side of a crankcase 22 of the engine 21 is supported by the pair of body frames 14. Since the engine 21 is supported by various frames, the rigidity of the entire vehicle is improved.

The engine 21 is a two-cylinder engine and includes the crankcase 22 having a vertically divided structure. A cylinder 23, the cylinder head 24, and a cylinder head cover 25 are mounted on an upper portion of the crankcase 22. A magnet cover 26 that covers a magnet (not shown) from the side is mounted on a left side surface of the crankcase 22. A sprocket cover 27 that covers a drive sprocket (not shown) from the side is mounted on the rear of the magnet cover 26. A clutch cover (not shown) that covers a clutch (not shown) from the side is mounted on a right side surface of the crankcase 22.

A swing arm 31 is swingably supported by an intermediate portion of the body frame 14. The swing arm 31 extends rearward from the body frame 14, and a rear wheel 32 is rotatably supported by a rear end of the swing arm 31. A front side of the swing arm 31 and a lower portion of a rear cushion 33 are connected via a cushion lever 34. An intermediate portion of the cushion lever 34 and the body frame 14 are connected via a cushion rod 41. Since the rear cushion 33 extends and contracts according to the swinging of the swing arm 31, the unevenness of the road surface is absorbed and the vibration is prevented, and the road contact performance between the road surface and the rear wheel 32 is improved.

A foot rest 71, a shift lever 51, and a heel guard 58 are mounted on a lower portion of the body frame 14. A foot of a driver is placed on the foot rest 71, the shift lever 51 receives a shift operation from the driver, and the heel guard 58 restricts a heel of the driver from interfering with the swing arm 31 or the like. Mounting positions of the foot rest 71, the shift lever 51, and the heel guard 58 on the body frame 14 are determined depending on a riding position, and a base end portion of the shift lever 51 may be mounted close to a front end portion of the cushion rod 41.

A mounting position of the cushion rod 41 is affected by an intake layout of the engine 21 and a lower bridge 15 (see FIG. 6) of the body frame 14. Due to the intake layout of the engine 21, the mounting position of the cushion rod 41 is lowered as the rear cushion 33 is disposed low, and the mounting position of the cushion rod 41 is raised as the lower bridge 15 of the body frame 14 is disposed high. In order to make the cushion lever 34 and the cushion rod 41 have an appropriate lever ratio, a layout of the cushion rod 41 is restricted by a structure of the body frame 14.

Accordingly, when the layouts of the shift lever 51 and the cushion rod 41 is subjected to various restrictions, it is difficult to sufficiently separate the mounting positions of the shift lever 51 and the cushion rod 41. When the mounting positions of the shift lever 51 and the cushion rod 41 overlap each other in the vehicle width direction with the body frame 14 sandwiched therebetween, the size of the vehicle increases, which adversely affects the riding position, and a tool line during mounting of the cushion rod 41 cannot be secured. Therefore, in the present embodiment, a predetermined portion of the body frame 14, at which the mounting positions of the shift lever 51 and the cushion rod 41 overlap each other, is opened to realize downsizing of the vehicle and securing of the tool line.

Figure 2:
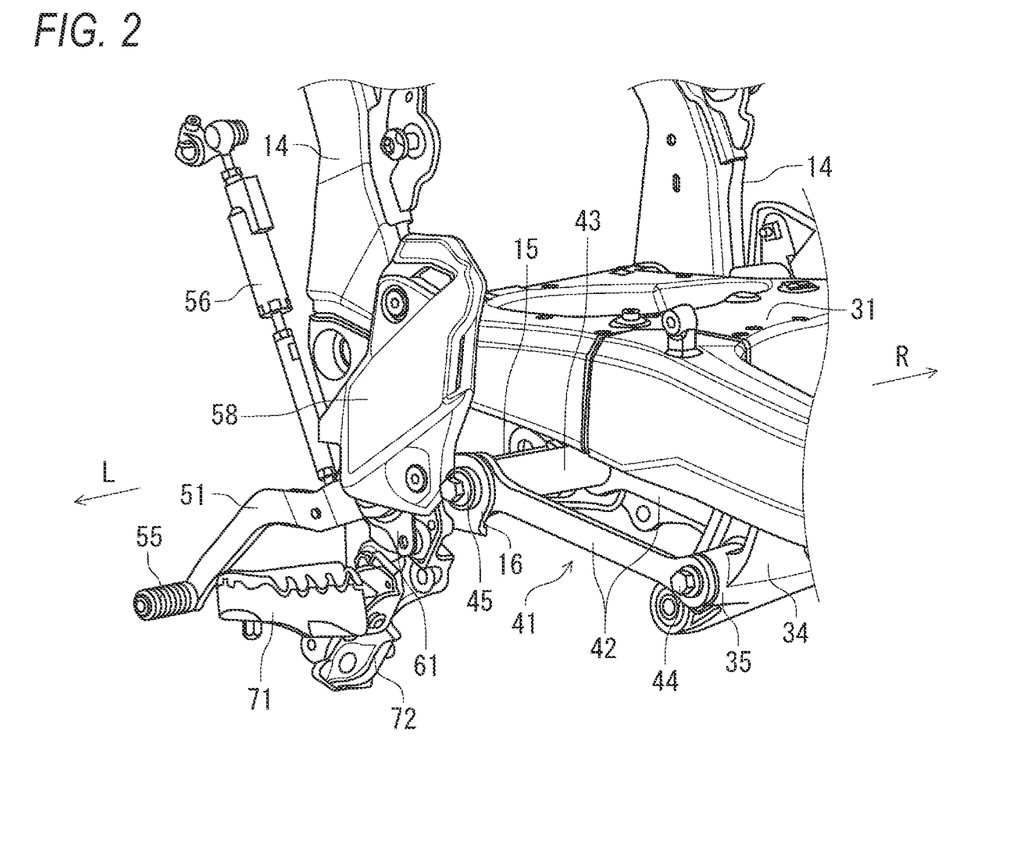
FIG. 2 is a perspective view of a mounting structure of a shift lever according to the present embodiment.
Figure 3:
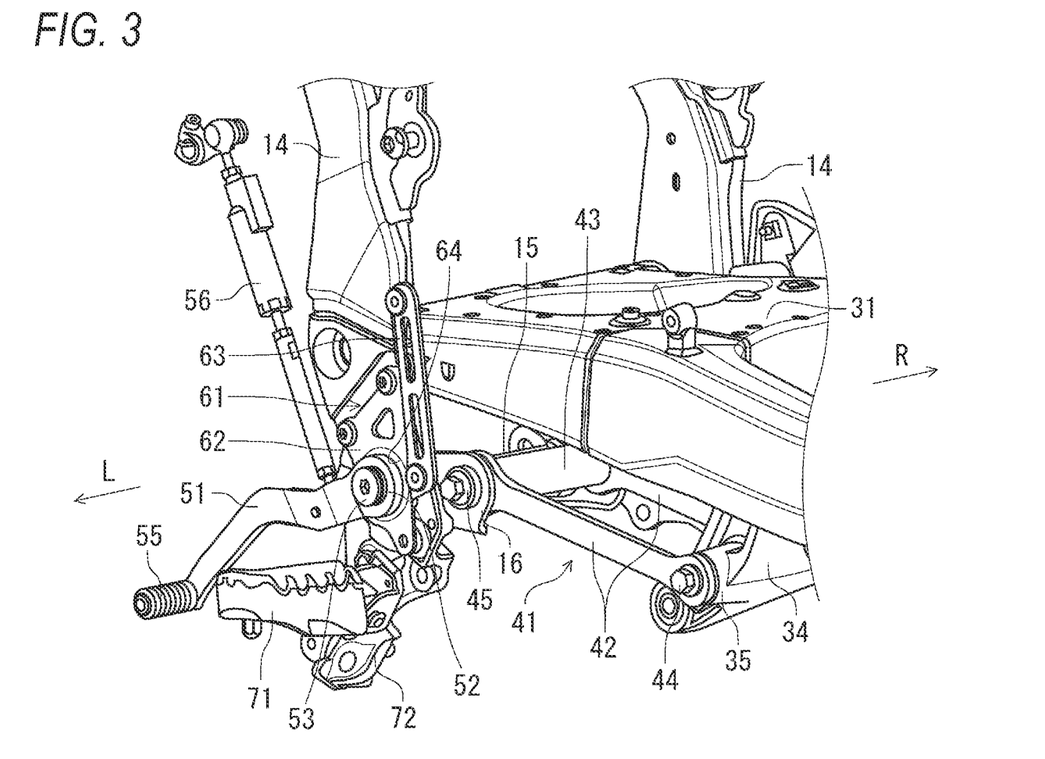
FIG. 3 is a perspective view in which a heel guard is removed from the mounting structure of the shift lever according to the present embodiment.
Figure 4:
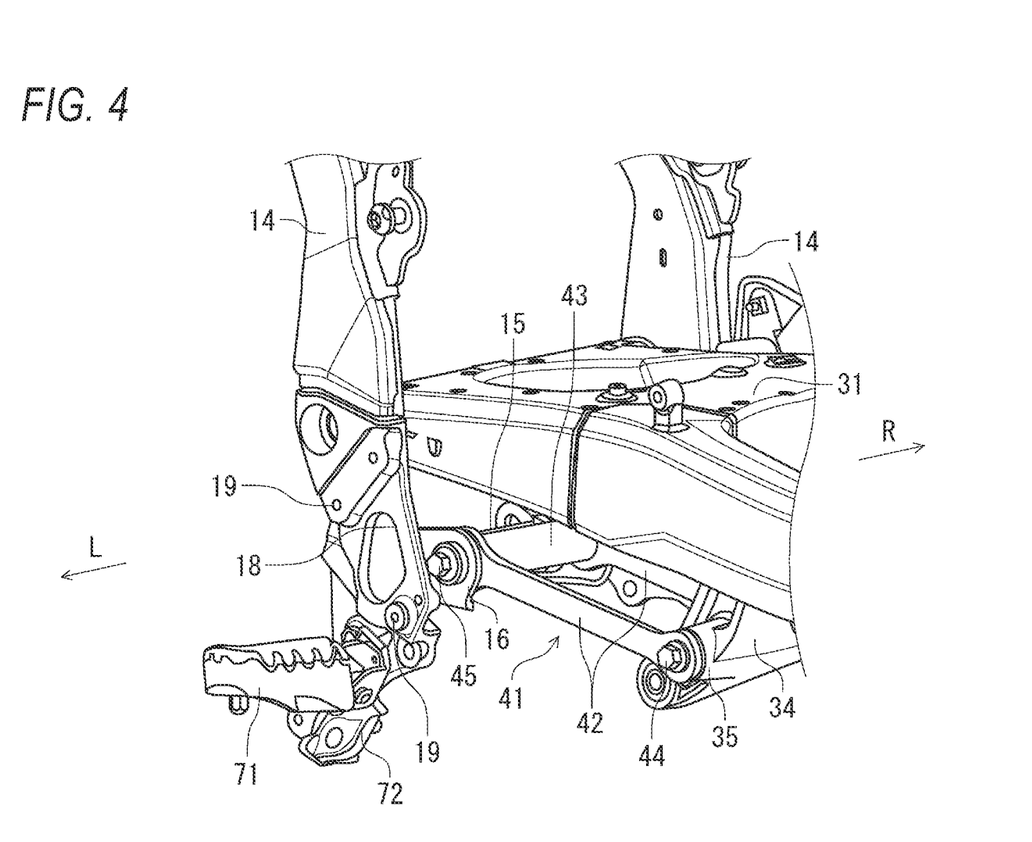
FIG. 4 is a perspective view in which a mounting bracket is removed from the mounting structure of the shift lever according to the present embodiment.

A mounting structure of the shift lever will be described with reference to FIGS. 2 to 4. FIG. 2 is a perspective view of the mounting structure of the shift lever according to the present embodiment. FIG. 3 is a perspective view in which the heel guard is removed from the mounting structure of the shift lever according to the present embodiment. FIG. 4 is a perspective view in which a mounting bracket is removed from the mounting structure of the shift lever according to the present embodiment. In FIGS. 2 to 4, the rear cushion is omitted for convenience of description.

As shown in FIG. 2, a front end portion of the swing arm 31 is supported by the pair of body frames 14, and the cushion lever 34 and the cushion rod 41 are connected to the swing arm 31. The cushion lever 34 is formed in an arc shape as seen in a side view, and a pair of bosses 35 protrude outward in the vehicle width direction from the intermediate portion of the cushion lever 34. The pair of bosses 35 are formed with a vent hole penetrating the cushion lever 34 in the vehicle width direction. A lower portion of the swing arm 31 is swingably connected to an upper end portion of the cushion lever 34, and a lower portion of the rear cushion 33 (see FIG. 1) is swingably connected to a lower end portion of the cushion lever 34.

The cushion rod 41 includes a pair of rod plates 42 spaced apart from each other in the vehicle width direction, and a bridge pipe 43 connecting front end portions of the pair of rod plates 42. Rear end portions of the pair of rod plates 42 are in contact with the pair of bosses 35 of the cushion lever 34 from the outside, and the cushion lever 34 is sandwiched between the rear end portions of the pair of rod plates 42. A connecting bolt 44 is inserted into a mounting hole of the rear end portions of the pair of rod plates 42 and the vent hole of the cushion lever 34, and the rear end portions of the pair of rod plates 42 and the cushion lever 34 are swingably connected via the connecting bolt 44.

The lower portions of the pair of body frames 14 are connected via the lower bridge 15, and a pair of brackets 16 protrude rearward from the lower bridge 15. The front end portions of the pair of rod plates 42 are in contact with the pair of brackets 16 from the inside, and the bridge pipe 43 is sandwiched between the pair of brackets 16. A connecting bolt 45 is inserted into a mounting hole of the front end portions of the pair of rod plates 42 and the bridge pipe 43, and the front end portions of the pair of rod plates 42 and the pair of brackets 16 are swingably connected via the connecting bolt 45. Accordingly, the front end portion of the cushion rod 41 is connected to inner sides of the pair of body frames 14 in the vehicle width direction.

As shown in FIGS. 2 and 3, a mounting bracket 61 is mounted on an outer surface of the body frame 14 on the outer side in the vehicle width direction, and the shift lever 51 is mounted on the body frame 14 via the mounting bracket 61. A cylindrical boss 52 (see FIG. 6 in particular) is integrally provided to the base end portion of the shift lever 51. A connecting bolt 53 (a mounting portion of the shift lever 51) is inserted into the cylindrical boss 52, and the shift lever 51 is connected to the mounting bracket 61. The shift lever 51 extends substantially obliquely downward toward the front from the cylindrical boss 52, and an operation portion 55 protrudes outward from a leading end portion of the shift lever 51 in the vehicle width direction.

A lower end of a shift rod 56 is connected to a middle portion of the shift lever 51 in an extension direction. The shift rod 56 extends obliquely upward from the shift lever 51, and an upper end of the shift rod 56 is connected to a shift device (not shown) of the engine 21. When the shift lever 51 is operated by the driver, an operation force is transmitted to the shift device via the shift rod 56, a combination of transmission gears is changed, and a shift change is executed. The cylindrical boss 52 of the shift lever 51 serves as a fulcrum, the operation portion of the shift lever 51 serves as a force point of receiving the operation force, and the middle portion of the shift lever 51 serves as an action point of moving the shift rod 56.

The mounting bracket 61 includes a main plate 62 on which the shift lever 51 is mounted, and a sub-plate 63 on which the heel guard 58 is mounted. The main plate 62 is formed in a substantially triangular shape in a side view, and each apex portion of the main plate 62 is screwed to the body frame 14 (lower screws are omitted). A substantially central portion of the main plate 62 is recessed in a circular shape, and the cylindrical boss 52 of the shift lever 51 is inserted into a circular recess 64. A screw boss 65 (see FIG. 6) protrudes inward from a bottom surface of the recess 64 of the main plate 62 in the vehicle width direction, and the connecting bolt 53 is fastened to the screw boss 65 through the cylindrical boss 52, so that the shift lever 51 is connected to the main plate 62.

The sub-plate 63 extends in an up-down direction along a rear edge of the main plate 62, and the heel guard 58 is screwed to two upper and lower portions of the sub-plate 63. The sub-plate 63 protrudes outward than the main plate 62 in the vehicle width direction, and the connecting bolt 53 of the shift lever 51 is covered by the heel guard 58 from the outer side in the vehicle width direction. By mounting the heel guard 58 to the outer side of the mounting bracket 61 (sub-plate 63) in the vehicle width direction, the shift lever 51 is protected from the heel of the driver, and the connecting bolt 53 of the shift lever 51 is hidden by the heel guard 58, thereby improving the appearance of the vehicle.

As shown in FIGS. 3 and 4, the connecting bolt 53 of the shift lever 51 is disposed on the outer side of the body frame 14 in the vehicle width direction, and the connecting bolt 45 of the cushion rod 41 is disposed on the inner side of the body frame 14 in the vehicle width direction. An opening portion 18 is formed on a portion of the body frame 14 facing the connecting bolt 53 of the shift lever 51 and the connecting bolt 45 of the cushion rod 41. The opening portion 18 of the body frame 14 is formed one step lower (on the inner side in the vehicle width direction) than a mounting portion of the mounting bracket 61, and the shift lever 51 and the cushion rod 41 face each other with a thin portion of the body frame 14, which is one step lower, is sandwiched therebetween.

In the body frame 14, screw holes 19 are formed corresponding to the apex portions of the main plate 62 of the mounting bracket 61. Here, the screw holes 19 are formed in two portions on the upper side of the opening portion 18 and in one portion on the lower side of the opening portion 18, and the mounting bracket 61 is fixed to the body frame 14 on the upper side and the lower side of the opening portion 18. As described above, the shift lever 51 extends forward from the mounting bracket 61, and the fixing portions of the mounting bracket 61 and the body frame 14 are separated from the shift lever 51 in a side view. Therefore, the mounting bracket 61 can be fixed to the body frame 14 without being obstructed by the shift lever 51.

In addition, when the mounting bracket 61 is fixed to the body frame 14, the opening portion 18 of the body frame 14 is covered by the mounting bracket 61 from the outside in the vehicle width direction. Although the rigidity of the body frame 14 is reduced by forming the opening portion 18 in the body frame 14, the body frame 14 is reinforced by the mounting bracket 61 due to fixing of the mounting bracket 61 to the body frame 14, thereby preventing the reduction in rigidity. Since the opening portion 18 is covered by the mounting bracket 61, components such as the connecting bolt 45 of the cushion rod 41 on the inner side in the vehicle width direction are hidden by a back side of the mounting bracket 61, thereby improving the appearance.

The screw boss 65 (see FIG. 6) protrudes inward from the mounting bracket 61 in the vehicle width direction, a tightening amount for holding the connecting bolt 53 is secured, and the shift lever 51 is stably supported with respect to the mounting bracket 61. Since the screw boss 65 is inserted into the opening portion 18 of the body frame 14, the screw boss 65 does not interfere with the body frame 14 even when the screw boss 65 largely protrudes inward from the mounting bracket 61 in the vehicle width direction. Therefore, the mounting bracket 61 is brought close to the body frame 14 in the vehicle width direction, and the degree of freedom of the riding position is improved without increasing the size of the straddle-type vehicle in the vehicle width direction.

Since the mounting bracket 61 is detachably fixed to the body frame 14, when the mounting bracket 61 is removed from the body frame 14, the connecting bolt 45 of the cushion rod 41 is exposed to the outside in the vehicle width direction through the opening portion 18 of the body frame 14. The tool line is secured on the inner side of the opening portion 18 of the body frame 14, thereby improving the assemblability of the cushion rod 41. When the mounting bracket 61 is removed from the body frame 14, the cushion rod 41 is easily accessed through the opening portion 18, and the maintainability is improved. The opening portion 18 is used not only to escape from the screw boss 65 but also to secure the tool line for the cushion rod 41.

On a lower side of the mounting bracket 61, a foot rest bracket 72 is mounted on the outer surface of the body frame 14 on the outer side in the vehicle width direction, and the foot rest 71 is mounted on the body frame 14 via the foot rest bracket 72. A mounting portion of the foot rest bracket 72 on the body frame 14 is formed one step lower (on the inner side in the vehicle width direction) than a forming portion of the opening portion 18 of the body frame 14. Accordingly, an amount of protrusion of the foot rest 71 outward in the vehicle width direction is reduced, and the degree of freedom of the riding position is improved without increasing the size of the straddle-type vehicle in the vehicle width direction.

Figure 5:
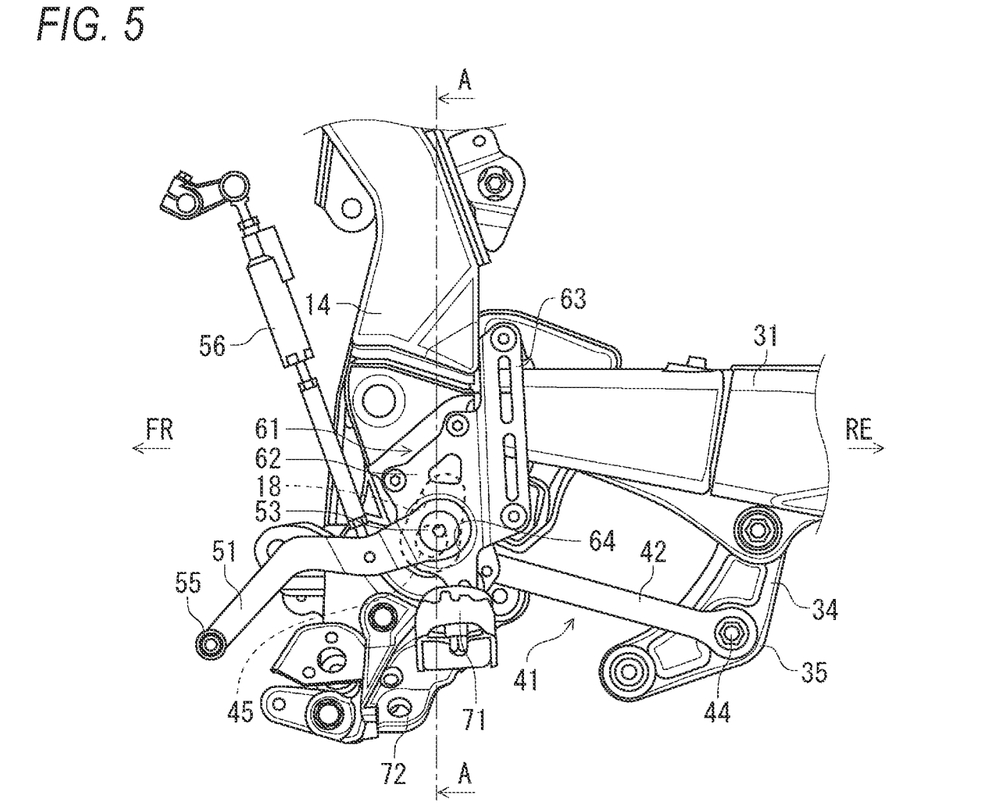
FIG. 5 is a side view in which the heel guard is removed from the mounting structure of the shift lever according to the present embodiment.
Figure 6:
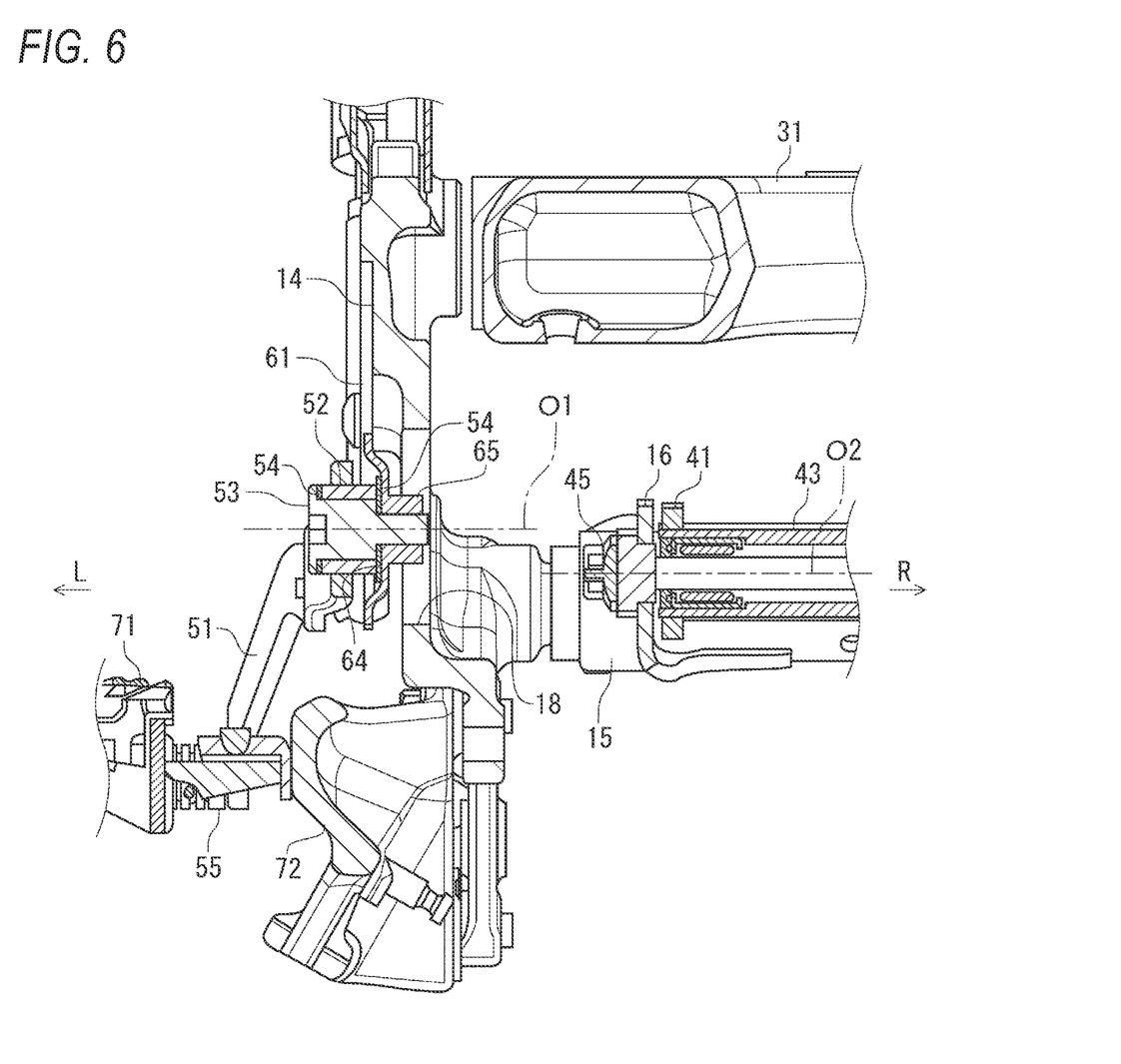
FIG. 6 is a cross-sectional view of the mounting structure of the shift lever of FIG. 5 taken along a line A-A.

A positional relationship between the connecting bolt of the shift lever and the connecting bolt of the cushion rod will be described with reference to FIGS. 5 and 6. FIG. 5 is a side view in which the heel guard is removed from the mounting structure of the shift lever according to the present embodiment. FIG. 6 is a cross-sectional view of the mounting structure of the shift lever of FIG. 5 taken along a line A-A.

As shown in FIGS. 5 and 6, the opening portion 18 is formed in the body frame 14 above the foot rest 71. As seen in a side view, the connecting bolt 53 of the shift lever 51 and the connecting bolt 45 of the cushion rod 41 overlap the opening portion 18, and the connecting bolt 53 of the shift lever 51 and the connecting bolt 45 of the cushion rod 41 are disposed on the inner side of the opening portion 18 (see FIG. 5 in particular). As described above, the screw boss of the mounting bracket 61 into which the connecting bolt 53 of the shift lever 51 is tightened is accommodated on the inner side of the opening portion 18, and the tool line to the connecting bolt 45 of the cushion rod 41 is secured by the opening portion 18.

The shift lever 51 is mounted on the mounting bracket 61 by a single connecting bolt 53 in a state in which both ends of the cylindrical boss 52 are sandwiched between a pair of washers 54. Although the connecting bolt 45 requires a sufficient holding force, a fitting length of the connecting bolt 45 is secured by the screw boss 65 protruding from the mounting bracket 61 to the inner side of the opening portion 18. The base end portion of the shift lever 51 is disposed in the recess 64 of the mounting bracket 61, and the opening portion 18 is formed in a portion recessed in the step shape of the body frame 14. Therefore, the base end portion of the shift lever 51 is brought closer to the inner side in the vehicle width direction, and an increase in a dimension of the straddle-type vehicle in the vehicle width direction is prevented.

The opening portion 18 is formed in the body frame 14 in a vertically long shape, and the connecting bolt 53 of the shift lever 51 and the connecting bolt 45 of the cushion rod 41 partially overlap each other in a side view. A center O1 of the connecting bolt 53 of the shift lever 51 and a center O2 of the connecting bolt 45 of the cushion rod 41 are separated from each other in an up-down direction, and the center O1 of the connecting bolt 53 of the shift lever 51 is disposed above the center O2 of the connecting bolt 45 of the cushion rod 41. Since the opening portion 18 becomes larger, the degree of freedom of a layout of the shift lever 51 on the inner side of the opening portion 18 is improved, a work space becomes wider, and the assemblability of the cushion rod 41 is also improved.

As described above, according to the mounting structure of the shift lever 51 according to the present embodiment, the rear cushion 33 extends and contracts according to the swinging of the swing arm 31 to absorb the unevenness or the like of the road surface, thereby improving the road contact performance between the rear wheel 32 and the road surface. Since the connecting bolt 53 of the shift lever 51 and the connecting bolt 45 of the cushion rod 41 overlap the opening portion 18 of the body frame 14, the size of the vehicle does not increase in the vehicle width direction. Therefore, even when the connecting bolt 53 of the shift lever 51 and the connecting bolt 45 of the cushion rod 41 are brought close to each other, the degree of freedom of the riding position is improved. In addition, the tool line is secured on the inner side of the opening portion 18 of the body frame 14, thereby improving the assemblability of the cushion rod 41.

Although the screw boss of the mounting bracket is inserted into the opening portion of the body frame in the present embodiment, the screw boss of the mounting bracket may not be inserted into the opening portion of the body frame. Even in such a case, the tool line for the cushion rod can be secured.

In addition, although the connecting bolt of the cushion rod is not inserted into the opening portion of the body frame in the present embodiment, the connecting bolt of the cushion rod may be inserted into the opening portion of the body frame. Accordingly, the size of the straddle-type vehicle in the vehicle width direction is not increased, and the degree of freedom of the riding position is improved.

In addition, in the present embodiment, the shift lever is disposed in the recess of the mounting bracket. However, the recess may not be formed in the mounting bracket.

In addition, although a predetermined portion of the mounting bracket protrudes inward in the vehicle width direction to form a screw boss in the present embodiment, a welding nut or the like may be provided in the mounting bracket instead of the screw boss.

In addition, although the connecting bolt of the shift lever and the connecting bolt of the cushion rod are separated from each other in an up-down direction in the present embodiment, the connecting bolt of the shift lever and the connecting bolt of the cushion rod may be separated from each other in a front-rear direction. In addition, the connecting bolt of the shift lever and the connecting bolt of the cushion rod may be disposed coaxially.

In addition, although the foot rest is mounted on the body frame in the present embodiment, the foot rest may be mounted on the mounting bracket.

In addition, the straddle-type vehicle is not limited to a general vehicle in which a driver rides on a seat in a posture of straddling the seat, and includes a scooter-type vehicle in which a driver rides without straddling a seat.

As described above, a first aspect is a mounting structure of a shift lever (51) on a body frame (14) which swingably supports a swing arm (31). The mounting structure of the shift lever includes: the shift lever that receives a shift operation from a driver; a rear cushion (33) that extends and contracts according to swinging of the swing arm; a cushion lever (34) that connects the rear cushion and the swing arm; and a cushion rod (41) that connects the cushion lever and the body frame. A mounting portion (connecting bolt 53) of the shift lever is disposed on an outer side of the body frame in a vehicle width direction. A mounting portion (connecting bolt 45) of the cushion rod is disposed on an inner side of the body frame in the vehicle width direction. An opening portion (18) is formed on the body frame. The mounting portion of the shift lever and the mounting portion of the cushion rod overlap the opening portion in a side view. According to this configuration, the rear cushion extends and contracts according to the swinging of the swing arm to absorb unevenness or the like of a road surface, thereby improving a road contact performance between a rear wheel and the road surface. Since the mounting portion of the shift lever and the mounting portion of the cushion rod overlap the opening portion of the body frame, a size of the vehicle does not increase in the vehicle width direction. Therefore, even when the mounting portion of the shift lever and the mounting portion of the cushion rod are brought close to each other, a degree of freedom of a riding position is improved. In addition, a tool line is secured on the inner side of the opening portion of the body frame, thereby improving the assemblability of the cushion rod. Furthermore, when the shift lever is removed, the cushion rod is easily accessed, and the maintainability is improved.

A second aspect directed to the first aspect includes a mounting bracket (61) mounted on the outer side of the body frame in the vehicle width direction. The shift lever is mounted on the body frame via the mounting bracket. A predetermined portion of the mounting bracket corresponding to the mounting portion of the shift lever protrudes inward in the vehicle width direction, and the protrusion portion (screw boss 65) is inserted into the opening portion. According to this configuration, the shift lever is mounted on the body frame via the mounting bracket, and the degree of freedom of the mounting portion of the shift lever is improved. When the mounting bracket is removed, the cushion rod is easily accessed, and the maintainability is improved. Furthermore, since the protrusion portion of the mounting bracket is inserted into the opening portion of the body frame, the degree of freedom of the riding position is improved without increasing the size of the vehicle in the vehicle width direction.

A third aspect directed to the second aspect includes a heel guard (58) mounted on an outer side of the mounting bracket in the vehicle width direction. The heel guard covers the mounting portion of the shift lever from outside in the vehicle width direction. According to this configuration, the mounting portion of the shift lever can be protected from a heel of a driver by covering the mounting portion of the shift lever with the heel guard. In addition, the mounting portion of the shift lever is hidden by the heel guard, and an appearance of the vehicle is improved.

In a fourth aspect directed to the second aspect or the third aspect, the opening portion of the body frame is formed one step lower than a mounting portion of the mounting bracket. According to this configuration, by using a stepped shape of an outer surface of the body frame, it is possible to implement a compact riding position by preventing an increase in size of the vehicle in the vehicle width direction.

In a fifth aspect directed to any one of the second aspect to the fourth aspect, a center of the mounting portion of the shift lever and a center of the mounting portion of the cushion rod are separated from each other in an up-down direction. According to this configuration, the mounting portion of the shift lever and the mounting portion of the cushion rod are separated from each other in the up-down direction, thereby improving the degree of freedom of the riding position. Since the opening portion is enlarged, the assemblability of the cushion rod is improved.

In a sixth aspect directed to any one of the second aspect to the fifth aspect, the shift lever extends forward from the mounting bracket, and the mounting bracket is fixed to the body frame on an upper side and a lower side of the opening portion. According to this configuration, since a fixing portion between the mounting bracket and the body frame is separated from the shift lever, the mounting bracket can be fixed to the body frame without being obstructed by the shift lever.

In a seventh aspect directed to any one of the second aspect to the sixth aspect, the mounting bracket covers the opening portion. According to this configuration, a decrease in rigidity of the body frame due to the opening portion can be prevented by the mounting bracket. In addition, the appearance is improved by covering the opening portion with the mounting bracket.

Although the present embodiment has been described, as another embodiment, the above-described embodiment and modifications may be combined entirely or partially.

In addition, the technique of the present disclosure is not limited to the above-described embodiments, and various changes, replacements, and modifications may be made without departing from the gist of the technical concept. Furthermore, as long as the technical concept can be realized in another way by the progress of the technique or another derivative technique, the present disclosure may be implemented using the method. Therefore, the claims cover all embodiments that may fall within the scope of the technical concept.

What is claimed is:

1. A mounting structure of a shift lever on a body frame which swingably supports a swing arm, the mounting structure of the shift lever comprising:
   the shift lever configured to receive a shift operation from a driver;
   a rear cushion configured to extend and contract according to swinging of the swing arm;
   a cushion lever connecting the rear cushion and the swing arm; and
   a cushion rod connecting the cushion lever and the body frame, wherein
   a mounting portion of the shift lever is disposed on an outer side of the body frame in a vehicle width direction,
   a mounting portion of the cushion rod is disposed on an inner side of the body frame in the vehicle width direction,
   an opening portion is formed on the body frame, and
   the mounting portion of the shift lever and the mounting portion of the cushion rod overlap the opening portion in a side view.

2. The mounting structure of the shift lever according to claim 1, further comprising:
   a mounting bracket mounted on the outer side of the body frame in the vehicle width direction, wherein
   the shift lever is mounted on the body frame via the mounting bracket,
   a predetermined portion of the mounting bracket corresponding to the mounting portion of the shift lever protrudes inward in the vehicle width direction, and
   the protrusion portion is inserted into the opening portion.

3. The mounting structure of the shift lever according to claim 2, further comprising:
   a heel guard mounted on an outer side of the mounting bracket in the vehicle width direction, wherein
   the heel guard covers the mounting portion of the shift lever from outside in the vehicle width direction.

4. The mounting structure of the shift lever according to claim 2, wherein
   the opening portion of the body frame is formed one step lower than a mounting portion of the mounting bracket.

5. The mounting structure of the shift lever according to claim 2, wherein
   a center of the mounting portion of the shift lever and a center of the mounting portion of the cushion rod are separated from each other in an up-down direction.

6. The mounting structure of the shift lever according to claim 2, wherein
   the shift lever extends forward from the mounting bracket, and
   the mounting bracket is fixed to the body frame on an upper side and a lower side of the opening portion.

7. The mounting structure of the shift lever according to claim 2, wherein
   the mounting bracket covers the opening portion.

* * * * *